Dec. 29, 1964   W. MESSERSCHMITT   3,163,382
ARRANGEMENT OF RETRACTIBLE UNDER-CARRIAGE
AND VERTICAL TAKE-OFF
Filed Oct. 22, 1962
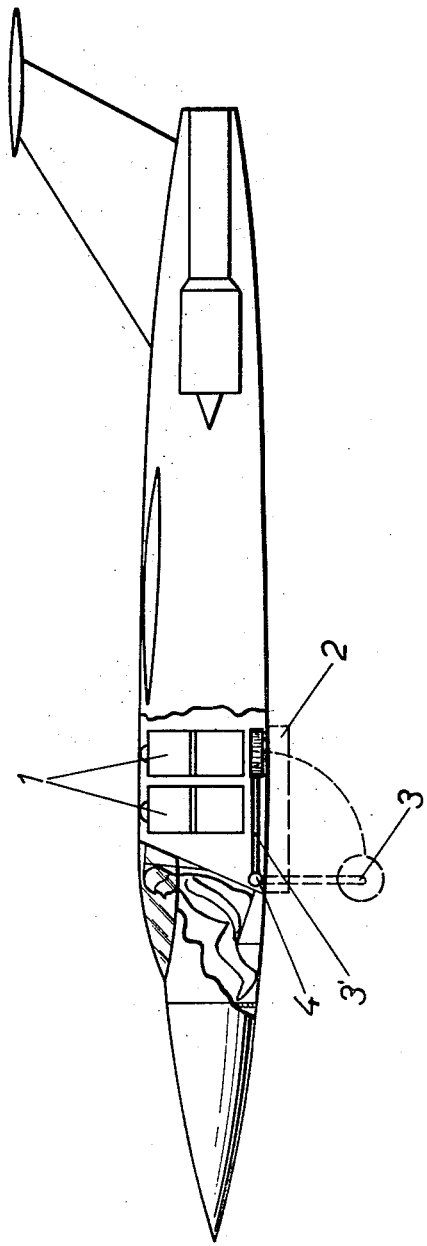
INVENTOR.
Willy Messerschmitt
BY
Michael S. Striker

3,163,382
ARRANGEMENT OF RETRACTIBLE UNDERCARRIAGE AND VERTICAL TAKE-OFF

Willy Messerschmitt, Munich, Germany, assignor to Messerschmitt AG, Augsburg, Germany, a company of Germany
Filed Oct. 22, 1962, Ser. No. 232,027
8 Claims. (Cl. 244—102)

The invention relates to small vertical take-off supersonic aircraft and relates more particularly to an arrangement of a retractible undercarriage with respect to the Vertical Take-Off (VTO) gear.

In supersonic aircraft it is advisable to keep the cross-section of the fuselage as small as possible. For this reason, in small supersonic aircraft the undercarriage may not be arranged under the pilot's seat as has hitherto been the case. As this determines the cross-section of the fuselage, it is necessary for an alternative solution to be found.

According to the invention this problem is solved for vertical take-off supersonic aircraft by swivel-mounting the retractible undercarriage underneath the VTO-gear.

In accordance with the invention the space into which the undercarriage retracts, and the VTO-gear, may be closed by a door in the underside of the fuselage. Should there be insufficient room with this arrangement below the VTO-gear for the struts of the retracted undercarriage, then the struts may lie outside the profile-line of the belly of the fuselage, but within the door in the floor thereof.

Preferably, a device is provided which is so arranged that the undercarriage is automatically lowered when the VTO-gear is put into operation for landing. Thus both the undercarriage and the door are simultaneously controlled, in particular by the same control-gear, so that the door or doors can only be operated in conjunction with the undercarriage.

A preferred embodiment of the invention is illustrated by way of example in the accompanying drawing.

In the drawing an aircraft is shown, in which two VTO units 1 are mounted behind the pilot. Underneath the VTO-gear, a retractible undercarriage 3 is mounted to turn about a swivel-point 4, so that in its retracted position 3' it lies under the VTO-gear. The space below the VTO-gear and the retracted undercarriage is closed by a door or doors 2 when in horizontal flight.

In the case of small supersonic aircraft fitted with VTO-gear, in which the entire cross-section of the fuselage is to be used, and there is no more space available to contain the retracted undercarriage within the profile of the fuselage, the undercarriage is arranged outside this profile so as to increase the cross-section as little as possible, and a door or doors are provided which are coupled to the operating mechanism of the undercarriage and the VTO-gear, and which when shut enclose the space below the retracted undercarriage and the VTO-gear.

I claim:

1. In a vertical take-off supersonic aircraft, in combination, a fuselage having a bottom formed with an opening; vertical take-off means located in said fuselage over said opening and adapted to discharge a downward stream of fluid through said opening; and an undercarriage mounted on said fuselage for movement between a retracted position located under said vertical take-off means, and an operative position located horizontally spaced from said vertical take-off means outside of said downward stream of fluid and underneath said bottom.

2. In a vertical take-off supersonic aircraft, in combination, a fuselage having a bottom formed with an opening; vertical take-off means located in said fuselage over said opening and adapted to discharge a downward stream of fluid through said opening; an undercarriage mounted on said fuselage for movement between a retracted position located under said vertical take-off means, and an operative position located horizontally spaced from said vertical take-off means outside of said downward stream of fluid and underneath said bottom; and door means mounted on said fuselage for movement to and from a position covering said undercarriage in said retracted position.

3. In a vertical take-off supersonic aircraft, in combination, a fuselage having a bottom formed with an opening; vertical take-off means located in said fuselage spaced from and above said bottom over said opening and adapted to discharge a downward stream of fluid through said opening; and an undercarriage mounted on said fuselage for movement between a retracted position located under said vertical take-off means and above said bottom over said opening, and an operative position located horizontally spaced from said vertical take-off means outside of said downward stream of fluid and underneath said bottom.

4. In a vertical take-off supersonic aircraft, in combination, a fuselage having a bottom formed with an opening; vertical take-off means located in said fuselage spaced from and above said bottom over said opening and adapted to discharge a downward stream of fluid through said opening; an undercarriage mounted on said fuselage for movement between a retracted position located under said vertical take-off means and above said bottom over said opening, and an operative position located horizontally spaced from said vertical take-off means outside of said downward stream of fluid and underneath said bottom; and door means mounted on said fuselage for movement between a position for closing said opening in said bottom in said retracted position of said undercarriage and an open position located horizontally spaced from said vertical take-off means and outside of said stream of fluid.

5. In a vertical take-off supersonic aircraft, in combination, a fuselage having a bottom formed with an opening; vertical take-off means located in said fuselage over said opening and adapted to discharge a downward stream of fluid through said opening; an undercarriage mounted on said fuselage for pivotal movement between a retracted position located under said vertical take-off means, and an operative position located horizontally spaced from said vertical take-off means outside of said downward stream of fluid and underneath said bottom; and door means mounted on said fuselage for pivotal movement to and from a position covering said undercarriage in said retracted position.

6. In a vertical take-off supersonic aircraft, in combination, a fuselage having a bottom formed with an opening; vertical take-off means located in said fuselage spaced from and above said bottom over said opening and adapted to discharge a downward stream of fluid through said opening; an undercarriage mounted on said bottom of said fuselage for pivotal movement between a retracted position located under said vertical take-off means and above said bottom over said opening, and an operative position located horizontally spaced from said vertical take-off means outside of said downward stream of fluid and underneath said bottom; and door means mounted on said fuselage for pivotal movement between a position for closing said opening in said bottom in said retracted position of said undercarriage and an open position located horizontally spaced from said vertical take-off means and outside of said stream of fluid.

7. In a vertical take-off supersonic aircraft, in combination, a fuselage having a bottom formed with an opening; vertical take-off means located in said fuselage spaced from and above said bottom over said opening and adapted to discharge a downward stream of fluid through said opening; an undercarriage mounted on said bottom of said fuselage for pivotal movement between a retracted position located under said vertical take-off means and above said botom over said opening, and an operative position located horizontally spaced from said vertical take-off means outside of said downward stream of fluid and underneath said bottom; and door means mounted on said fuselage for pivotal movement between a position for closing said opening in said bottom in said retracted position of said undercarriage and an open position located horizontally spaced from said vertical take-off means and outside of said stream of fluid, said door means being operatively connected with said undercarriage so that said door means closes said opening when said undercarriage is in said retracted position, and is in said open position when said undercarriage is in said operative position.

8. In a vertical take-off supersonic aircraft, in combination, a fuselage having a bottom formed with an opening; vertical take-off means located in said fuselage spaced from and above said bottom over said opening and adapted to discharge a downward stream of fluid through said opening; an undercarriage mounted on said bottom of said fuselage for pivotal movement between a retracted position located under said vertical take-off means and above said bottom over said opening, and an operative position located horizontally spaced from said vertical take-off means outside of said downward stream of fluid and underneath said bottom; and door means mounted on said fuselage for pivotal movement between a position for closing said opening in said bottom in said retracted position of said undercarriage and an open position located horizontally spaced from said vertical take-off means and outside of said stream of fluid, said door means being operatively connected with said undercarriage so that said door means closes said opening when said undercarriage is in said retracted position, and is in said open position when said undercarriage is in said operative position, said door means and said undercarriage being operatively connected with said vertical take-off means so that the same can discharge said stream of fluid only in said open position of said door means and in said operative position of said undercarriage.

References Cited by the Examiner
UNITED STATES PATENTS

| | | | |
|---|---|---|---|
| 918,336 | 4/09 | Lake | 244—12 |
| 1,801,833 | 4/09 | Allen | 244—12 |
| 2,987,271 | 6/61 | Heath et al. | 244—102 X |

MILTON BUCHLER, *Primary Examiner.*
ANDREW H. FARRELL, *Examiner.*